(12) United States Patent
Deutschle et al.

(10) Patent No.: US 8,151,085 B2
(45) Date of Patent: Apr. 3, 2012

(54) METHOD FOR ADDRESS TRANSLATION IN VIRTUAL MACHINES

(75) Inventors: Joerg Deutschle, Winnenden (DE); Ute Gaertner, Schoenaich (DE); Erwin Pfeffer, Lam (DE); Chung-Lung Kevin Shum, Wappingers Falls, NY (US); Bruce Wagar, Pasadena, CA (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/353,478

(22) Filed: Jan. 14, 2009

(65) Prior Publication Data
US 2009/0187731 A1    Jul. 23, 2009

(30) Foreign Application Priority Data

Jan. 17, 2008 (EP) .................................. 08150337

(51) Int. Cl.
*G06F 13/00* (2006.01)
*G06F 13/28* (2006.01)

(52) U.S. Cl. ................. 711/206; 711/118; 711/E12.058
(58) Field of Classification Search .................. 711/206, 711/E12.058, 118
See application file for complete search history.

(56) References Cited

U.S. PATENT DOCUMENTS 5,317,705 A * 5/1994 Gannon et al. ................ 718/100
6,418,522 B1 * 7/2002 Gaertner et al. ............. 711/207

* cited by examiner

*Primary Examiner* — Edward Dudek, Jr.
(74) *Attorney, Agent, or Firm* — Dennis Jung

(57) ABSTRACT

The invention relates to a method for address translation in a system running multiple levels of virtual machines containing a hierarchically organized translation lookaside buffer comprising at least two linked hierarchical sub-units, a first sub-unit comprising a lookaside buffer for some higher level address translation levels, and the second sub-unit comprising a lookaside buffer for some lower level address translation levels, and said second sub-unit being arranged to store TLB index address information of the upper level sub-unit as tag information in its lower level TLB structure, comprising the steps of collecting intermediate address translation results on different virtual machine levels; and buffering the intermediate translation results in the translation lookaside buffer.

12 Claims, 7 Drawing Sheets

METHOD FOR ADDRESS TRANSLATION IN VIRTUAL MACHINES

FIELD OF THE INVENTION

The invention relates to computer systems and, more particularly, to virtual machine systems which provide for instruction processing in multiple levels of virtual machines.

BACKGROUND OF THE INVENTION

Mainframe computer systems such as the IBM eServer z900® system, offered by International Business Machines Corporation, Armonk, N.Y., comprise a plurality of processors. (IBM® is a registered trademark of International Business Machines, Armonk, N.Y., U.S.A. Other names used herein may be registered trademarks or product names of International Business Machines or other companies.) These large systems are capable of processing a large number of tasks in a short period of time. It is frequently desirable to divide this host processing power into separate partitions of "virtual machines" that can be operated by different users. The division is accomplished by the use of host control program software. Virtual machines with multi-level guests are described in the patent U.S. Pat. No. 5,317,705 A. Each of the virtual machines can accept a "guest" operating system that may be different from the host operating system. The guest virtual machines may in turn be divided into additional virtual machines for performance of certain tasks.

A guest may also use dynamic address translation (DAT). A guest virtual address 10 is first translated to a guest real address 12, using guest translation tables, see FIG. 1. The guest real address 12 is converted to a host virtual address by adding to it the host virtual address (step 14) at which the guest storage begins (host origin) in the host address space. The host address is then translated to the host real address 16 by using the host translation tables.

Address translation is usually performed by dedicated hardware circuitries consisting of a translation engine 26 and the translation lookaside buffer (TLB) 28 in a central processing unit (CPU) 20, as shown in FIG. 2. The translation engine 26 executes the translation process, i.e. fetches memory data that contain the translation tables stored in main memory 30 via a first level high speed cache 24 and a second level medium speed cache 22. The combined region- and segment-table entry (CRSTE) portion of TLB 28 contains the page-table origin (PTO), which is the translation results of all region- and segment-table entries. The page-table entry (PTE) portion of TLB 28 stores the recently used page table entries. A translation table entry is usually 8 bytes wide. Fetching this entry usually transfers a so called cache line from main memory 30 to the first and second level caches, which contains the 8 byte translation table data. The translation engine 26 is also known as picocode engine. Such a picocode engine is described by T. J. Slegel, E. Pfeffer and J. A. Magee in "The IBM eServer z990 microprocessor", IBM J. Res. & Dev., vol. 48, no. 3/4, May/July 2004 which is incorporated for disclosure by its entirety.

The principle of the translation process is shown in FIG. 3. The IBM ESAME architecture describes the address translation process in detail; it uses up to five different translation tables, i.e. region, segment (ST) 42, and page tables (PT) 44. The effective address-space-control-element (ASCE) 40 designates the translation table to be used. For simplicity reasons the segment table 42 was chosen, which allows to translate virtual addresses up to a width of 31 bits. The ASCE 40 with table origin (TO) and designation type (DT) contains the segment-table origin (STO); the segment index portion (SX) of the virtual address 50 is added to select an entry in the segment table 42. The segment table entry STE contains the page table origin (PTO) and the page index portion (PX) of the virtual address 50 is added to select an entry in page-table, which contains the page-frame real address (PFRA). When this address is concatenated with the byte index field BX of the virtual address, a real address 46 is obtained.

The TLB captures the results of DAT and provides a shortcut for future translations. It has a limited capacity, so only a certain number of recent translations are maintained (e.g. 4096). The Translation Engine tests whether or not a translation from virtual to real is available in TLB. If available, it is used and DAT is bypassed. The background of the invention is described by T. J. Slegel, E. Pfeffer and J. A. Magee in "The IBM eServer z990 microprocessor", IBM J. Res. & Dev., vol. 48, no. 3/4, May/July 2004, particularly on pp. 295-309.

Prior art TLB can store intermediate translation results of a certain guest level, as disclosed in U.S. Pat. No. 6,418,522 B1. The principle is depicted in FIG. 4. IBM mainframe ESAME requires five fetches to translate a 64-bit address and usually just the page index of the virtual address changes. Hence the change affects only the lowest and last one used table, for which the start address of it will be saved, i.e. the page table origin (PTO) and can be used again, if this page table is required. Thus, all accesses to the higher translation tables, as e.g. segment, region tables are bypassed (bypass 70 bypassing fetching of segment table entry STE from the second level cache in 64) and page table entry PTE is fetched from the first level cache L1 in 66 and a Real Address is obtained in 68. For this purpose the TLB is arranged in two portions as mentioned above (see FIG. 2). The combined region- and segment-table entry (CRSTE) portion contains the translation results of all region- and segment-table entries, which is the page-table origin. The page-table entry (PTE) portion of the TLB stores the recently used page table entries PTE. Thus, following a TLB lookup 60, a TLB hit 62 in the CRSTE portion bypasses (bypass 70) accesses to all region- and segment tables.

As shown in FIG. 4 bypassing access to the region and segment tables will save one table fetch (fetch from second level cache in 64), if a translation starts with an access to the segment table; more table fetches will be saved if region tables are in use. As shown in FIG. 5, which is discussed below in detail, there are at least five table fetches necessary to translate a guest virtual address. These table-fetches lead to considerable CPU performance loss.

SUMMARY OF THE INVENTION

Objects of the invention are to provide a method and a system with an improved performance of address translation when translating a virtual address into a real address.

These objects are achieved by the features of the independent claims. The other claims and the specification disclose advantageous embodiments of the invention.

A method is proposed for address translation in a system running multiple levels of virtual machines containing a hierarchically organized translation lookaside buffer comprising at least two linked hierarchical sub-units, a first sub-unit comprising a lookaside buffer for some higher level address translation levels, and the second sub-unit comprising a lookaside buffer for some lower level address translation levels, and said second sub-unit being arranged to store TLB index address information of the upper level sub-unit as tag information in its lower level TLB structure, comprising the steps of collecting intermediate address translation results on different virtual machine levels;

buffering the intermediate translation results in the translation lookaside buffer.

Advantageously, by storing intermediate translation results in TLB the performance of address translation in a system running multiple levels of virtual machines can be improved. The number of control steps to translate a virtual address into a real address can favorably be reduced. The improvement can be enhanced by a preferred special caching scheme for frequently and infrequently used table fetch data.

A method and apparatus for efficient address translation in a system running multiple levels of virtual machines is introduced. The method comprises a hierarchically organized translation lookaside buffer (TLB) to buffer intermediate translation results. These intermediate values are used to bypass several translations steps for subsequent translation requests for a slightly different virtual address and therefore reduce the number of translation table fetches. For translation steps, which cannot be bypassed, the table fetch data are cached in a high-speed cache, whereas non-frequently used table fetch data, i.e. data for translation steps, which are often bypassed, are cached in a larger low-speed cache.

In prior art systems the buffered values were dedicated to a certain virtual machine level; with the new translation scheme intermediate translation results, collected on different virtual machine levels are buffered. This reduces the number of accesses to translation tables and the number of translation data to be cached in the high-speed cache, and greatly improves overall system performance. Preferably, only page translation tables of the guest have to be located within the page boundaries to provide for bypassing of all translation table fetches up to the guest page table in guest (nested) translations. Particularly, the translation table data of not bypassed table fetches, e.g. the guest page table data, are cached in a high speed cache to improve translation performance.

BRIEF DESCRIPTION OF THE DRAWINGS

The present invention together with the above-mentioned and other objects and advantages may best be understood from the following detailed description of the embodiments, but not restricted to the embodiments, wherein is shown in.

Figure 1:
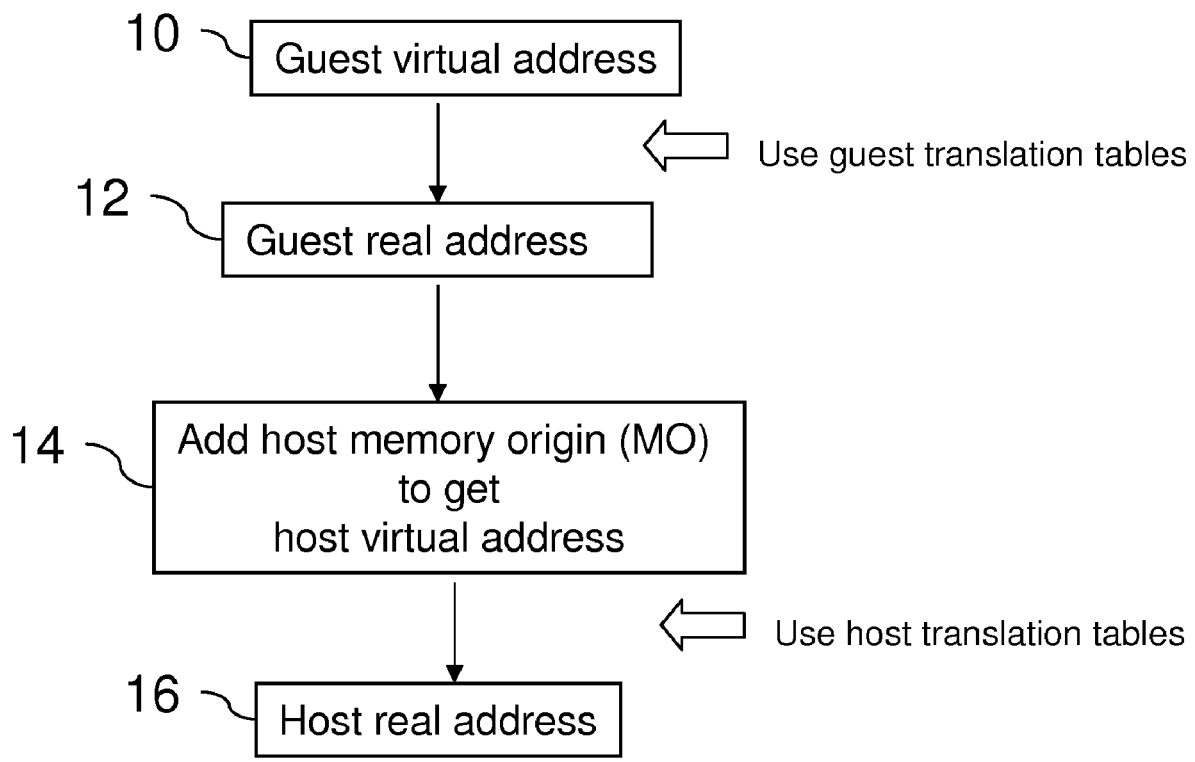
FIG. 1 a basic principle for translation of guest addresses according to the prior art.
Figure 2:
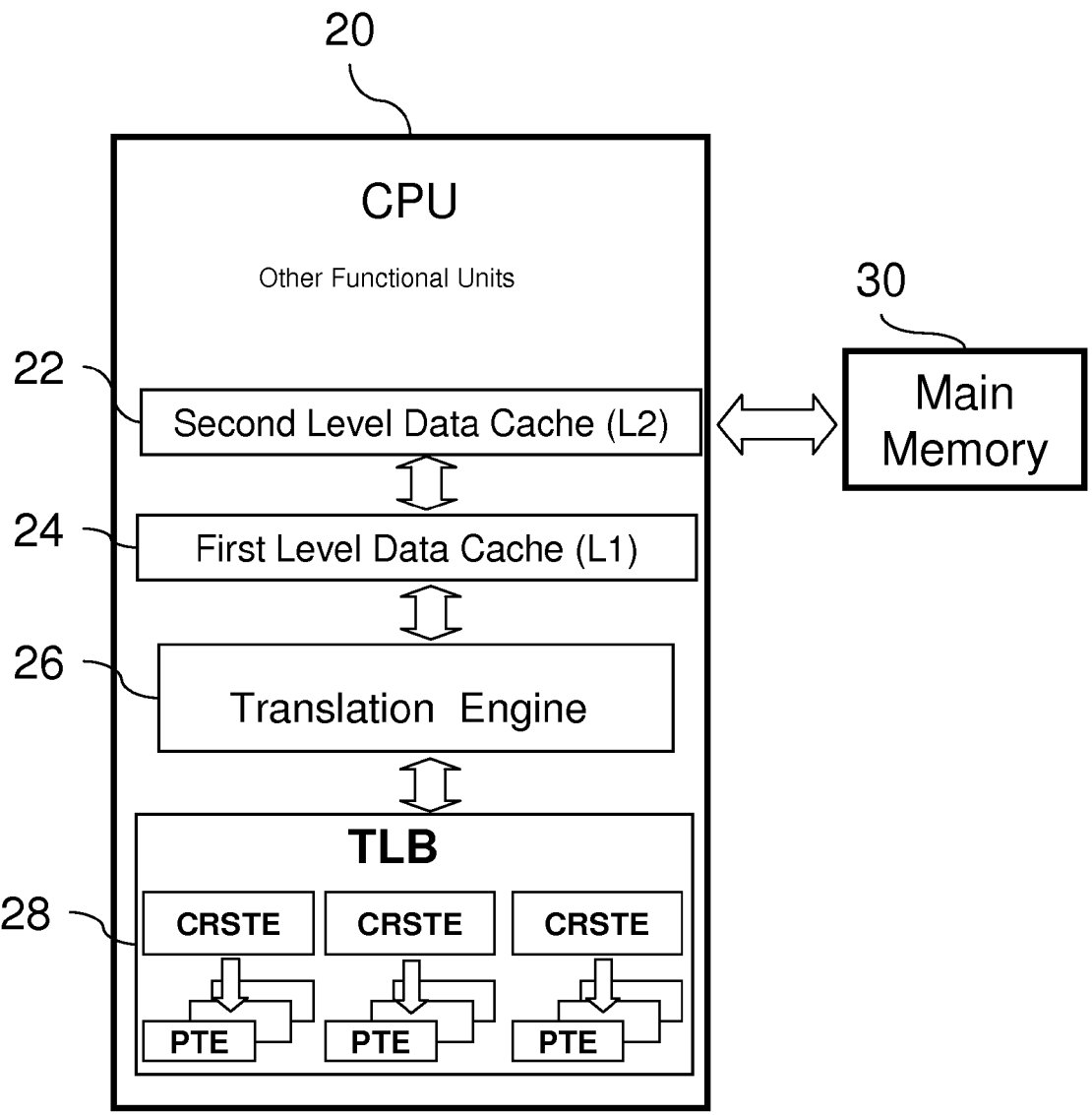
FIG. 2 an address translation according to the prior art.
Figure 3:
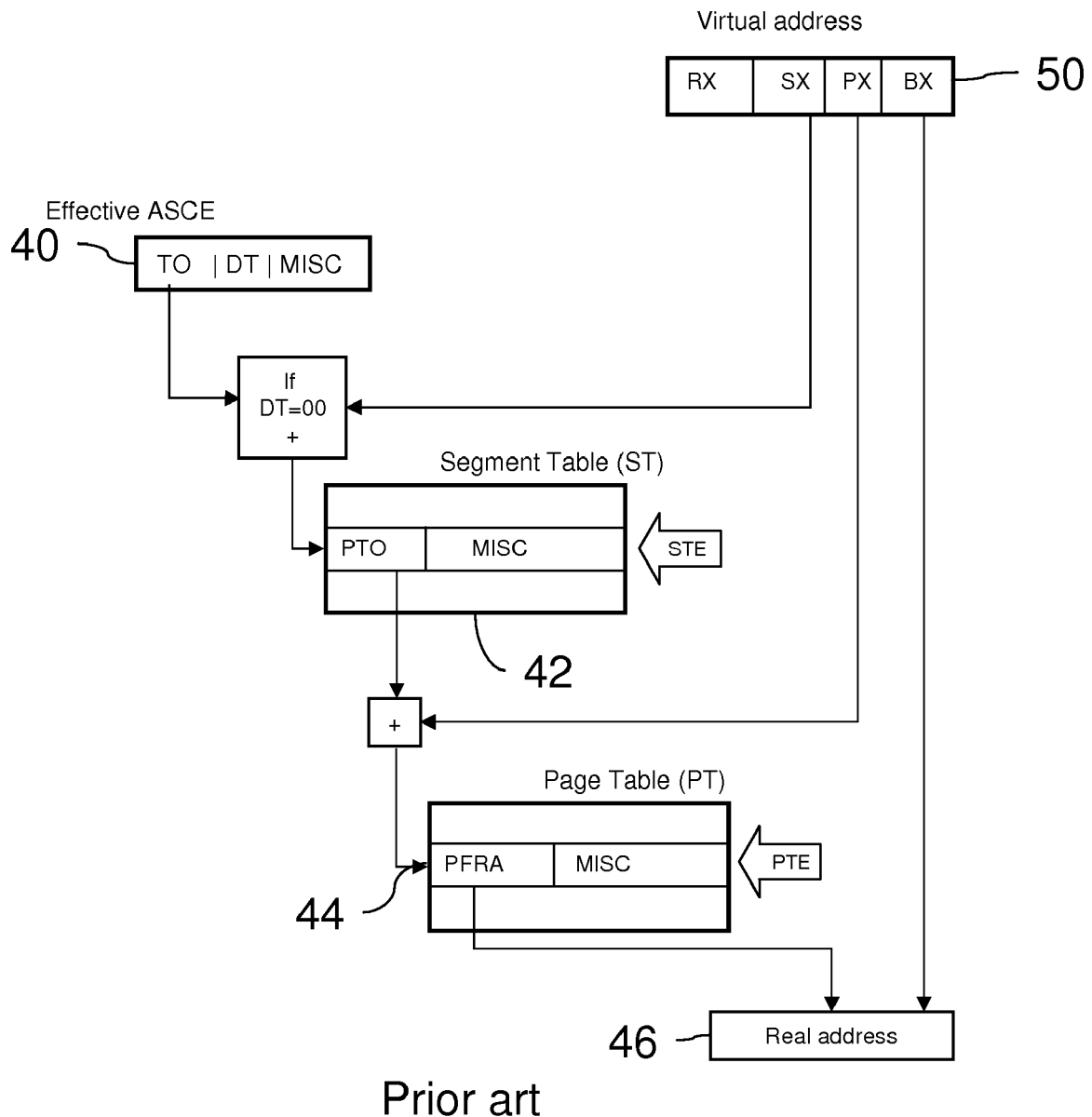
FIG. 3 a translation process according to the prior art.
Figure 4:
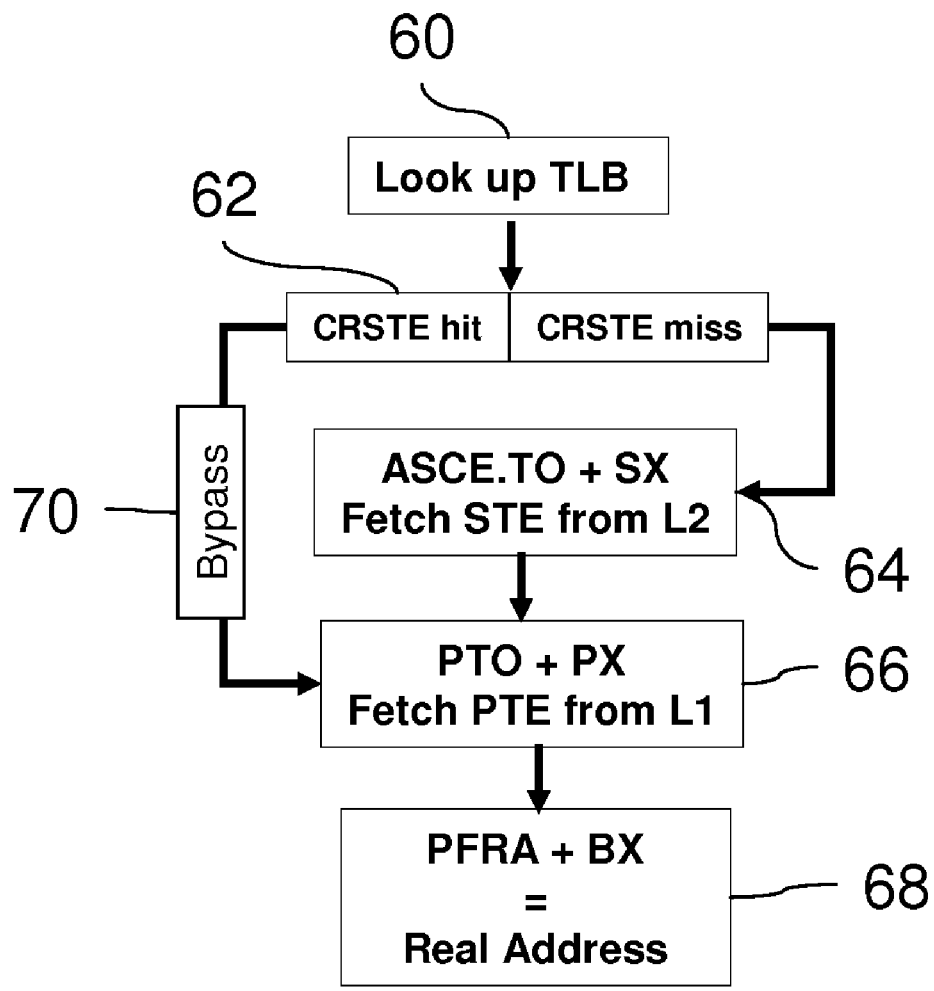
FIG. 4 bypassing of translation steps according to the prior art.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

A hierarchically organized translation lookaside buffer as set forth above is disclosed in U.S. Pat. No. 6,418,522 B1, which is incorporated by reference in it entirety. The so called combined region- and segment-table entry CRSTE covers the higher-level address-translation levels and the so called page table entry PTE covers the lowest translation level. An advantage of this scheme is that output of the CRSTE is a valid page table origin when a hit is found for the higher address bits and a valid entry was built before. In this case, since all accesses to the higher-level translation tables (region- and segment-tables) are bypassed, there is a considerable performance gain when there is a hit in the CRSTE but a miss in the PTE. With this feature, the start address of the table can be found within one cycle and can be used for the last table access to obtain the absolute address. The linkage of the CRSTE to the PTE is established by means of seven bits of the segment index from the full 64-bit virtual address. These bits serve as an index address covering the address range of the CRSTE; the same information is used as tag information in the PTE and is used as a quick reference for any lookup operation in order to find the absolute address of the relevant virtual address translation.

Basic information for a translation process is described on pages 3-39 to 3-43 in z/Architecture, Principles of Operation, SA22-7832-04, IBM®, Fifth edition, September 2005, which is incorporated by reference in its entirety.

The shortcomings of the prior art are overcome through the following measures:

Reducing the number of control steps to translate a virtual address into a real address by bypassing translation steps on host and guest level. Additionally a special caching scheme for frequently and infrequently used tables fetch data can be applied. Bypassing translation steps may reduce the number of translation steps to two.

Figure 5:
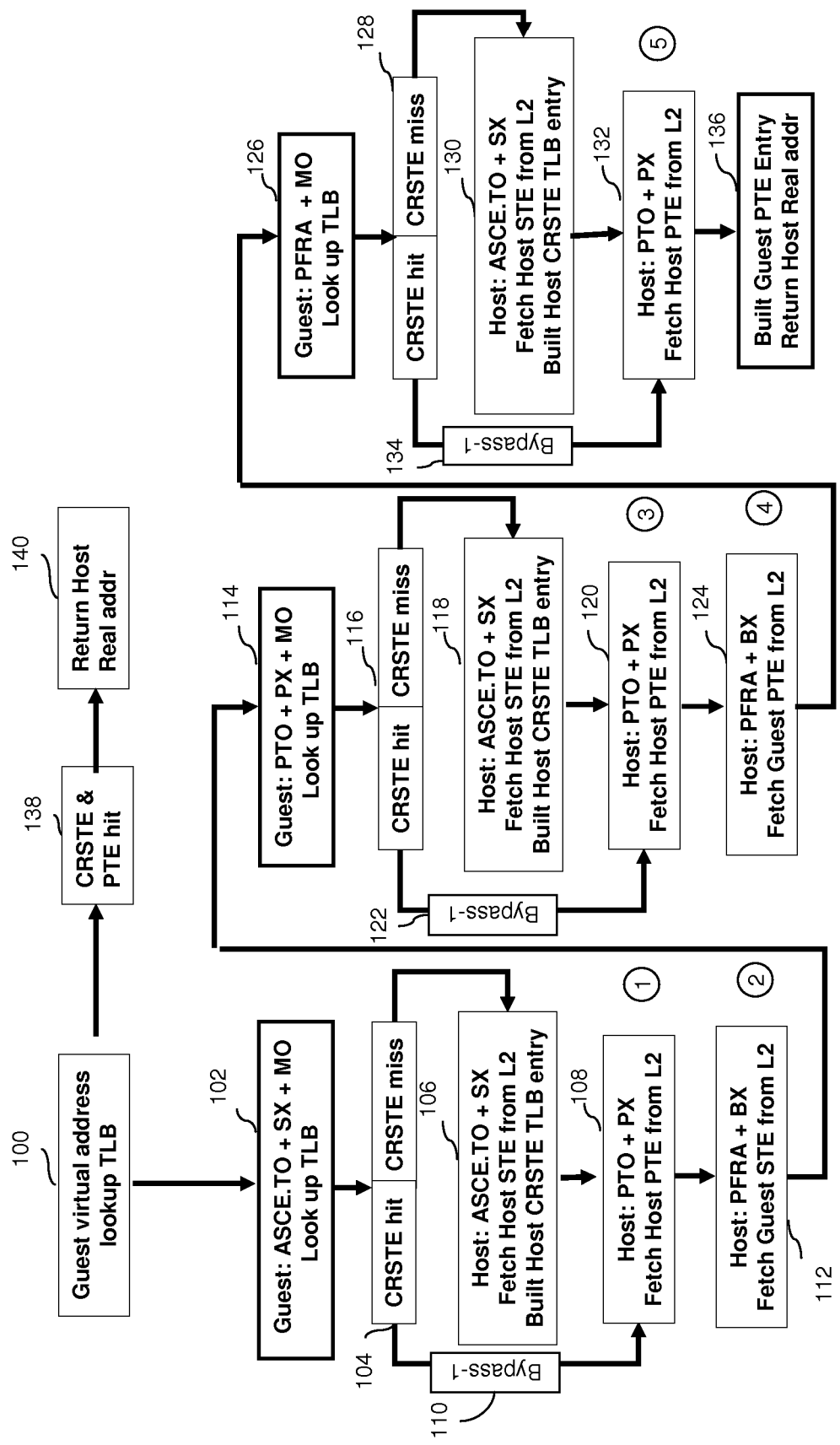
FIG. 5 a translation of guest addresses with bypass according to the prior art.

A prior art translation process is depicted in FIG. 5. A functional unit of a central processing unit CPU requests a translation for a guest virtual address. The guest virtual address is looked up in the translation lookaside buffer TLB (step 100). If there is a hit in the combined-region-and-segment-table-entry CRSTE as well as in page table entry PTE (step 138), the requested host real address is already stored in the TLB and is returned to the requesting functional unit of the CPU (step 140).

The guest virtual address has to be translated using all guest translation tables:

In step 102 the guest table origin TO contained in the guest address-space-control-element ASCE and the guest segment index SX are added. The result is per definition a guest real address, therefore, the memory origin MO at which the guest storage begins (step 102) is added. This host virtual address is translated as shown below:

A lookup of the CRSTE portion of the TLB is done to test if the host PTO is already stored in the TLB (step 104):

If no (CRSTE miss): the host segment index SX is added to the host table origin TO contained in the host ASCE and the host segment table index STE is fetched, which contains the host page table origin PTO. A host CRSTE TLB entry is built (step 106), which can be used in future translations as Bypass-1 (step 110), and it is continued with step 108 where the host page index PX is added to the host PTO and this address is used to fetch the host PTE from the second level cache L2.

If yes (CRSTE hit): Bypass-1 in 110 is taken to step 108, the host page index PX is added to the host PTO and this address is used to fetch the host PTE from the second level cache L2 (step 108).

The host PTE contains the host PFRA. The host byte index BX is added and the guest segment table entry STE is fetched from the second level cache L2, which contains the guest PTO (step 112). In the prior art translation process, two table fetches have been performed, indicated by circled numbers 1 and 2 in steps 108 and 112.

The result in step 112 is per definition a guest real address, therefore, the page index PX and the memory origin MO at which the guest storage begins are added (step 114). Per definition, a guest real address is handled as a host virtual address, and this host virtual address is translated as shown in step 116 up to step 124. Two table fetches have to be performed, indicated by circled numbers 3 and 4, one in step 120 where the host PTE is fetched and one in step 124 where the guest PTE is fetched.

The guest PTE contains the guest PFRA, a guest real address. Per definition, the memory origin MO is added (step 126). The result is then translated by applying the translation steps shown in 128 up to step 132 with or without bypass step 134, depending if there is a CRSTE hit or not. If there is a CRSTE miss, host CRSTE TLB entry 130 is built and a fifth table fetch has to be performed in step 132.

The host PTE fetched in step 132 contains the host PFRA, which is the final translation result (step 136). This result is returned to the requesting functional CPU unit and is stored in the PTE portion of the TLB.

Figure 6:
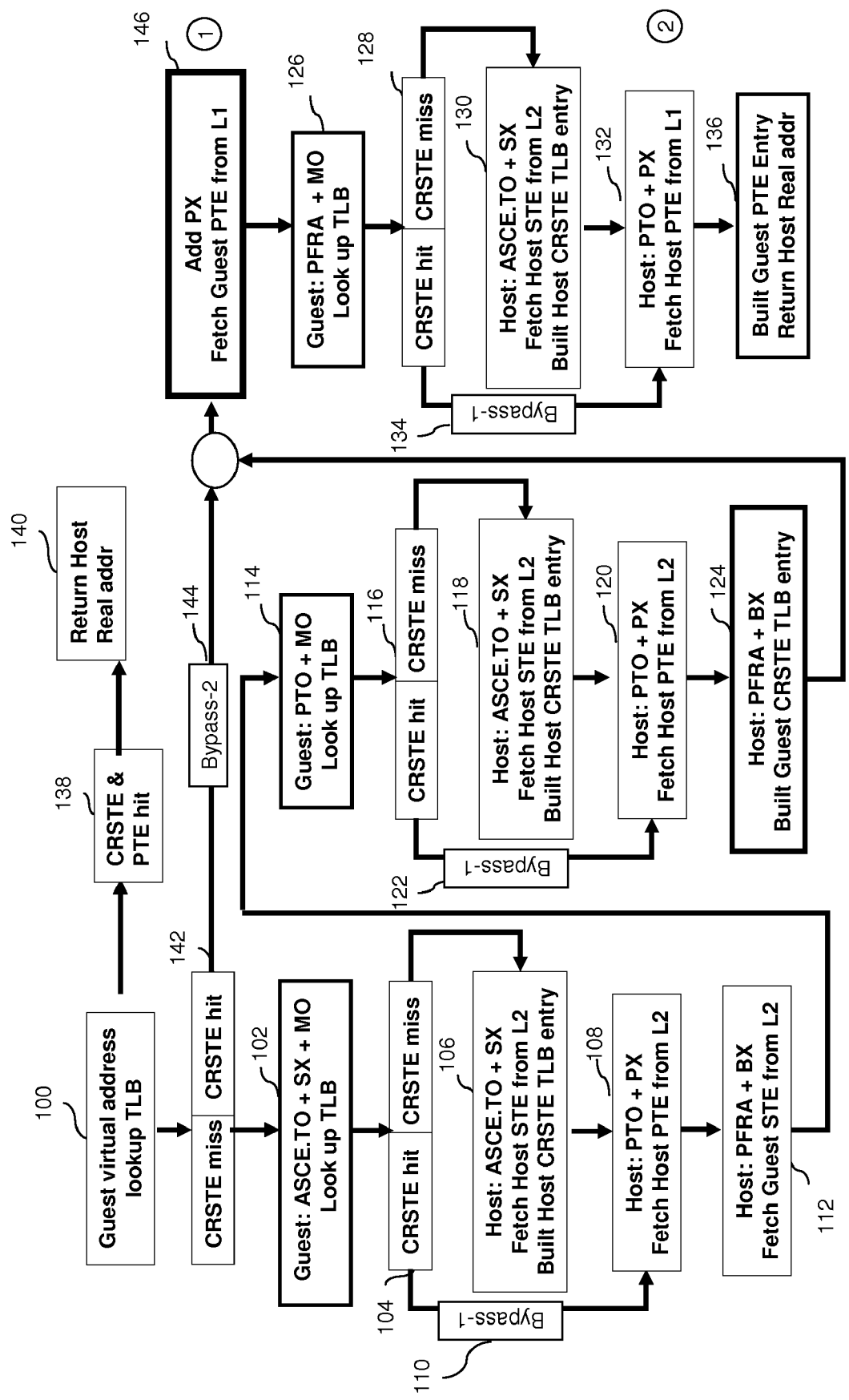
FIG. 6 a preferred translation process of guest addresses with bypass.

A preferred embodiment of the invention is described FIG. 6. FIG. 5 described above illustrates the prior art translation steps for a guest virtual address translation down to a host real address; the enhancements are shown in FIG. 6 and are explained in detail below.

A functional unit of a CPU requests a translation for a guest virtual address. The guest virtual address is looked up in the translation lookaside buffer TLB (step 100). If there is a hit in the combined-region-and-segment-table-entry CRSTE as well as in page table entry PTE (step 138), the requested host real address is already stored in the TLB and is returned to the requesting functional unit of the CPU (step 140).

In case of a miss (step 142) in the CRSTE and PTE portion of the TLB, the guest virtual address has to be translated using all guest translation tables:

In step 102 the guest table origin TO contained in the guest address-space-control-element ASCE and the guest segment index SX are added. The result is per definition a guest real address, therefore, the memory origin MO at which the guest storage begins (step 102) is added. This host virtual address is translated as shown below:

A lookup of the CRSTE portion of the TLB is done to test if the host PTO is already stored in the TLB (step 104):

If no (CRSTE miss): the host segment index SX is added to the host table origin TO contained in the host ASCE and the host segment table entry STE is fetched, which contains the host page table origin PTO. A host CRSTE TLB entry is built (step 106), which can be used in future translations as Bypass-1 (step 110) and it is continued with step 108 where the host page index PX is added to the host PTO and this address is used to fetch the host PTE from the second level cache L2.

If yes (CRSTE hit): Bypass-1 in 110 is taken to step 108, the host page index PX is added to the host PTO and this address is used to fetch the host PTE from the second level cache L2 (step 108).

The host PTE contains the host PFRA. The host byte index BX is added and the guest STE is fetch from the second level cache L2, which contains the guest PTO (step 112). In the prior art translation process in FIG. 5, two table fetches have been performed, indicated by circled numbers 1 and 2.

Again, per definition the memory origin MO is added (step 114) and this host virtual address is translated as shown in step 116 up to step 124, where if there is a CRSTE hit, Bypass-1 in 122 is used, the host page index PX is added to the host PTO and this address is used to fetch the host PTE from the second level cache L2 (step 120). If there is a CRSTE miss, a host CRSTE TLB entry 118 is built. In the prior art translation process in FIG. 5, two table fetches have been performed, indicated by circled numbers 3 and 4. Further, in the prior art translation process in FIG. 5, the memory origin MO as well as the page index PX is to be added to the guest PTO in step 114.

The host PTE contains the host PFRA. The host BX is added and this value stored in TLB (step 124). Compared to the prior art translation scheme shown in FIG. 5 storing this intermediate translation result will allow to using this value as Bypass-2 (step 144) in case of an CRSTE hit (step 142) on guest level. Bypass-2 eliminates all translation down to this translation step and therefore improves the translation performance to a high degree.

In case of a CRSTE hit without a PTE hit (step 142), bypass-2 is active (step 144) and the value which is stored in the CRSTE is the system real address of the guest page-table origin TO. The bypass 144 spans guest and host translations. The bypass 144 is only possible if the guest page table does not cross a page boundary and the system real address of the page table origin is pre tested if valid and does not generate any host access exceptions for this host translation if used. The system architecture must provide that page tables do not cross page boundaries. Pre-testing if valid without exceptions is performed by the translation engine, which is preferably a picocode engine.

The two cache lines containing the not-bypassed guest and the host PTE are buffered in a high speed cache (L1 cache). Since there are just two lines to be cached, the performance loss for other required high speed cache operations can be neglected. There is a high probability that other portions of the two cache lines are used for future translations, e.g. if the page address increments by one, because each cache line contains 16 page table entries. That means a virtual address range of 16 pages of 4 Kbytes, assuming a page size of 4 Kbytes is defined, is covered with one cache line. The table-fetch data, which are bypassed in future translations are not needed to be cached in a high speed cache and can be cached in a medium speed cache (L2 cache). According to the invention, preferably only such table-fetch data which are frequently used are cached in the high speed L1 cache, whereas those table-fetch data which are less frequently used are stored in the medium speed cache L2 together with the frequently used table-fetch data which are also stored in the high speed cache L1. Which table-fetch data are frequently or less frequently used can easily be derived from performance measurements and/or modeling of the application. Preferably, data from region and segment table are less frequently used and hence stored in the medium speed cache. A frequently used table is the page table; these data are stored in the high speed cache L1 as well as the medium speed cache. By using this caching scheme it is possible to increase the performance considerably.

Bypass-2 can only be applied if the following two conditions are met:
(A) The guest translation table does not cross a page boundaries, i.e. the complete table must reside within a page, because at this point of translation the guest page table origin (PTO) has been translated using the host tables, whereas in the prior art translation scheme, the guest PTO+ PX has been processed. If the guest table crosses a page boundary this PTO would be incorrect for all translations using the next page and applying this bypass would lead to false translation results. Therefore, this bypass is only possible e.g. for IBM ESAME translation tables and not for IBM ESA/390 tables, since the latter cross page boundaries.

(B) The TLB entry to be stored must not generate a translation exception down to all host translation steps, because in case of an exception, the translator unit has to provide the virtual address, which has led to the exception (in this case the host virtual address) to the operating system (OS), necessary for resolving the exceptional condition. Taking Bypass-2 the host virtual address cannot be retrieved in case of an exception.

Compared to prior art translation scheme shown in FIG. 5, the guest page index PX is added not until the guest PTO has been translated using host tables, and the guest PTE is fetched using this address (step 146). The address used to fetch the guest page table entry is the sum of the guest PTO, translated by the host tables and the guest page index as is.

The guest PTE fetched in step 146 from the first level cache L1 contains the guest PFRA, a real address, which is translated applying the translation steps shown in 126 up to step 132.

The host PTE fetched in step 132 contains the host PFRA, which is the final translation result (step 136). This result is returned to the requesting functional CPU unit and is stored in the PTE portion of the TLB.

In case of a miss in the PTE, but a hit in the CRSTE portion of the TLB (step 142), the PTO stored in the CRSTE is the host real address to the guest page table. The translation engine uses this entry to fetch the guest PTE (step 146). At this point the remaining translation steps are identical to step 126 up to step 136. With the new translation scheme only two table fetches are necessary to translate a guest virtual to a host real address, if the Bypass-2 is used.

If a hit in CRSTE and PTE is found (step 138) the TLB stores already the requested address translations and returns the host real address (step 140).

As shown in FIG. 6 translation tables are fetched in some cases from L1 or from L2 cache. Analogously, table fetch data are cached in L1 and L2 or only in L2. In normal operation mode several translation steps are bypassed by storing intermediate translation results in the TLB. That means it is not necessary to cache these table fetch data in high speed caches. There are just a two table fetches remaining, e.g. host and guest page table, which are not bypassed, and only these table fetch data need to be cached in a high speed cache, because a reduced access time for table fetches increase the translation performance.

In general only data from a cache line fetched from page tables is used again, e.g. if the virtual address is linear incremented by CPU instructions, which move large data areas, or even by the instruction address itself, which is usually incremented from one instruction to the other one. Whenever a page boundary is crossed, a previously fetched cache line may contain the new page table entry.

Figure 7:
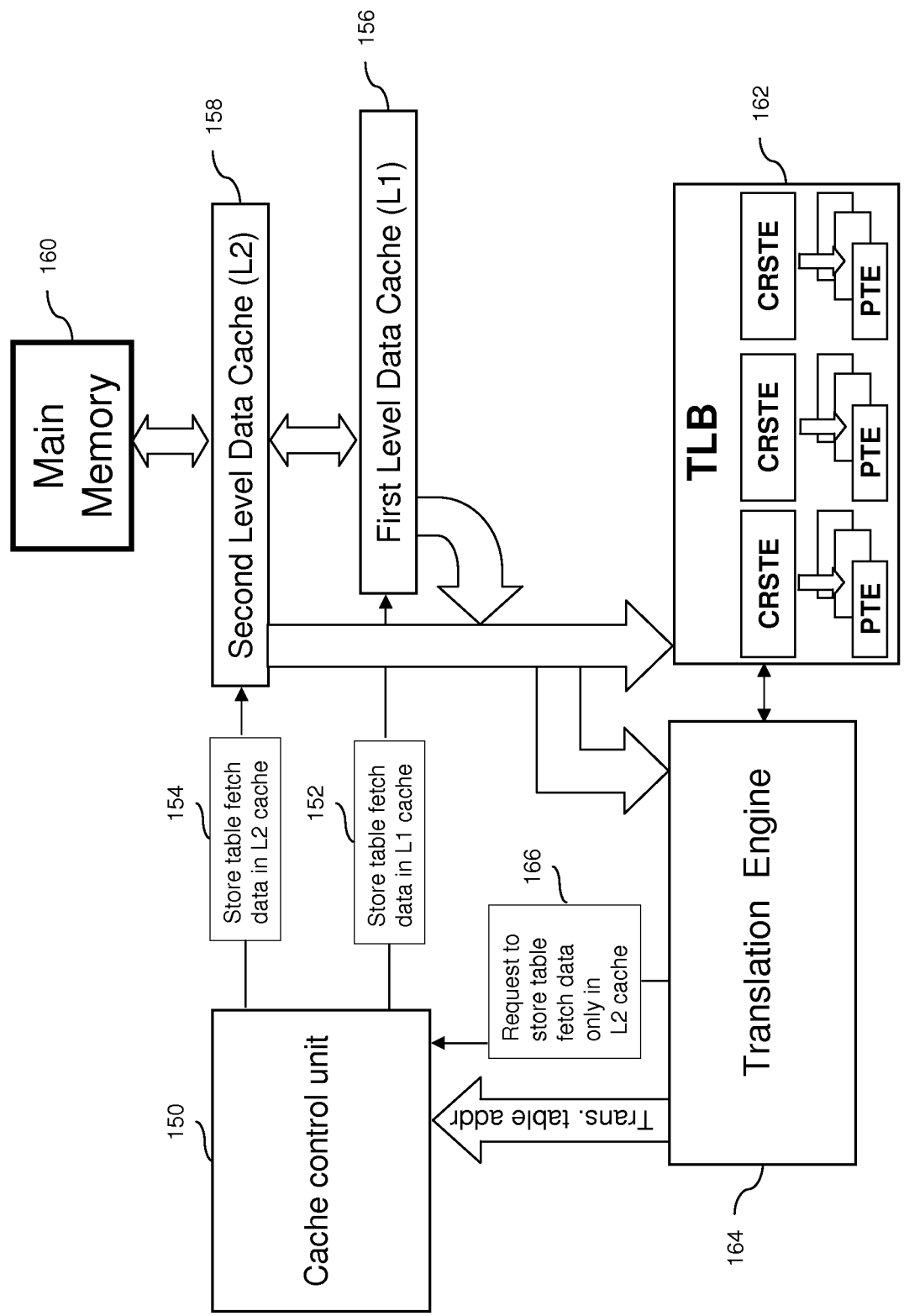
FIG. 7 a preferred cache control for translation table data.

FIG. 7 shows a preferred control logic to provide caching of table fetches in the level 1 (L1) high speed cache 156 and the level 2 (L2) medium speed cache 158 or just in the medium speed cache 158. The cache level to be used for translation table fetches is controlled by the Translation Engine 164 and should be free-programmable. Address translation is performed by Translation Engine 164 and the translation lookaside buffer (TLB) 162. The request 166 to store table fetch data 154 only in L2 cache 158 is initiated by the Translation Engine 164 and sent with the translation table address to the L1/L2 cache control unit 150. In turn of this request, table fetch data 152 fetched from main memory 160 are cached in cache 156 and 158 or just in cache 158. If already cached in cache 158 it will be cached in cache 156 if the request 166 specifies caching in cache 156 and cache 158.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O-devices (including, but not limited to keyboards, displays, pointing devices, etc.) can be coupled to the system either directly or through intervening I/O controllers.

Network adapters may also be coupled to the system to enable the data processing system or remote printers or storage devices through intervening private or public networks. Modems, cable modem and Ethernet cards are just a few of the currently available types of network adapters.

The invention claimed is:

1. A method for address translation in a system running multiple levels of virtual machines containing a hierarchically organized translation lookaside buffer comprising at least two linked hierarchical sub-units, a first sub-unit comprising a lookaside buffer for some higher level address translation levels, and the second sub-unit comprising a lookaside buffer for some lower level address translation levels, and said second sub-unit being arranged to store TLB index address information of the upper level sub-unit as tag information in its lower level TLB structure, comprising the steps of:
    collecting intermediate address translation results on different virtual machine levels; and
    buffering the intermediate translation results in the translation lookaside buffer;
    wherein: the intermediate address translation results are used to bypass translations steps for subsequent translation requests for a slightly different virtual address;
    a caching scheme for frequently used table fetch data is handled differently from infrequently used table fetch data; and
    for translation steps which cannot be bypassed, the table fetch data are cached in a high-speed cache, and infrequently used table fetch data which are often bypassed, are cached in a low-speed cache.

2. The method according to claim 1, wherein translation tables are located within page boundaries to provide for bypassing of all translation table fetches up to the guest page table in guest translations.

3. The method according to claim 1, wherein the guest page index is added not until the guest page table origin has been translated using host tables, and the guest page table entry is fetched using this address.

4. The method according to claim 3, wherein the address used to fetch the guest page table entry is the sum of the guest PTO, translated by the host tables and the guest page index as is.

5. A computer program product for executing a machine instruction in a central processing unit, the computer program product comprising:
a tangible computer readable storage medium readable by a processor and storing instructions for execution by the processor for performing a method for address translation in a system running multiple levels of virtual machines containing a hierarchically organized translation lookaside buffer comprising at least two linked hierarchical sub-units, a first sub-unit comprising a lookaside buffer for some higher level address translation levels, and the second sub-unit comprising a lookaside buffer for some lower level address translation levels, and said second sub-unit being arranged to store TLB index address information of the upper level sub-unit as tag information in its lower level TLB structure, the method comprising:
collecting intermediate address translation results on different virtual machine levels; and
buffering the intermediate translation results in the translation lookaside buffer;
wherein the intermediate address translation results are used to bypass translations steps for subsequent translation requests for a slightly different virtual address;
a caching scheme for frequently used table fetch data is handled differently from infrequently used table fetch data; and
for translation steps which cannot be bypassed, the table fetch data are cached in a high-speed cache, and infrequently used table fetch data which are often bypassed, are cached in a low-speed cache.

6. The computer program product according to claim 5, wherein translation tables are located within page boundaries to provide for bypassing of all translation table fetches up to the guest page table in guest translations.

7. The computer program product according to claim 5, wherein the guest page index is added not until the guest page table origin has been translated using host tables, and the guest page table entry is fetched using this address.

8. The computer program product according to claim 7, wherein the address used to fetch the guest page table entry is the sum of the guest PTO, translated by the host tables and the guest page index as is.

9. A computer system for executing a machine instruction in a central processing unit, said computer system comprising:
a memory; and
a processor coupled to the memory, the computer system configured to perform a method for address translation in a system running multiple levels of virtual machines containing a hierarchically organized translation lookaside buffer comprising at least two linked hierarchical sub-units, a first sub-unit comprising a lookaside buffer for some higher level address translation levels, and the second sub-unit comprising a lookaside buffer for some lower level address translation levels, and said second sub-unit being arranged to store TLB index address information of the upper level sub-unit as tag information in its lower level TLB structure,
the method comprising:
collecting intermediate address translation results on different virtual machine levels; and
buffering the intermediate translation results in the translation lookaside buffer;
wherein the intermediate address translation results are used to bypass translations steps for subsequent translation requests for a slightly different virtual address;
a caching scheme for frequently used table fetch data is handled differently from infrequently used table fetch data; and
for translation steps which cannot be bypassed, the table fetch data are cached in a high-speed cache, and infrequently used table fetch data which are often bypassed, are cached in a low-speed cache.

10. The system according to claim 9, wherein translation tables are located within page boundaries to provide for bypassing of all translation table fetches up to the guest page table in guest translations.

11. The system according to claim 9, wherein the guest page index is added not until the guest page table origin has been translated using host tables, and the guest page table entry is fetched using this address.

12. The system according to claim 11, wherein the address used to fetch the guest page table entry is the sum of the guest PTO, translated by the host tables and the guest page index as is.

* * * * *